Nov. 5, 1968  D. S. CHISHOLM  3,409,712
METHOD OF DEVOLATILIZATION OF SYNTHETIC RESINOUS
THERMOPLASTIC MATERIALS
Filed July 22, 1966
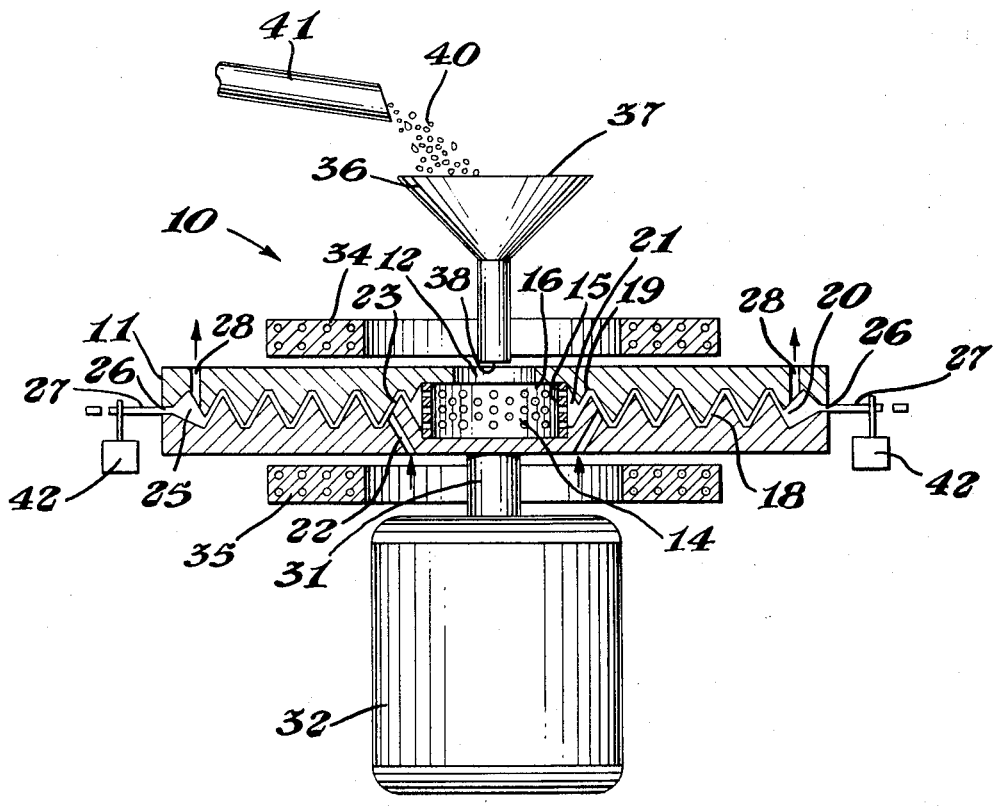
INVENTOR.
Douglas S. Chisholm
BY
AGENT

United States Patent Office

3,409,712
Patented Nov. 5, 1968

3,409,712
METHOD OF DEVOLATILIZATION OF SYNTHETIC
RESINOUS THERMOPLASTIC MATERIALS
Douglas S. Chisholm, Midland, Mich., assignor to The
Dow Chemical Company, Midland, Mich., a corporation of Delaware
Filed July 22, 1966, Ser. No. 567,167
8 Claims. (Cl. 264—176)

This invention relates to an improved method for the devolatilization of synthetic resinous thermoplastic materials, and more particularly contains a method for the devolatilization of synthetic resinous thermoplastic materials which may employ either solid or liquid material as feedstock.

A wide variety of methods and apparatus have been employed to remove small amounts of volatile material from synthetic thermoplastic resins. These techniques have included extrusion from an extruder having a volatile port, extrusion under vacuum, falling film devolatilizers and the like. However, many synthetic resinous thermoplastic materials are heat sensitive and tend to degrade on exposure to elevated temperatures. Various heat stabilizers are added to overcome this problem. Many of the halogen containing polymers such as those containing chlorine or bromide which are of a thermoplastic nature are extremely heat sensitive and have a useful life which depends oftentimes on the heat history of the polymer. For example, a vinylidene chloride resin composition which has been fabricated into an article and the article evaluated for heat resistance will show varying degrees of heat resistance depending on the heat history of the composition during fabrication. Thus, in many instances, it is highly desirable to perform an operation upon the thermoplastic composition in such a manner that the composition is held at an elevated temperature for only a minimum length of time. Conventional devolatilization procedures are oftentimes undesirable. If low temperatures are employed, the length of time required for the operation is excessive. If high temperatures are employed, undesired degradation of the polymer results which is generally in proportion to the temperature of processing and the length of time the polymer has been held at the elevated temperature. Substantial and significant difficulties arise with such heat sensitive polymers in that retention of small portions of a thermally degradable plastic composition oftentimes results in severe local decomposition and can result in black spots of charred resin which can render a mass of polymer totally unsuitable for the preparation of thin transparent film.

It would be desirable if there were available an improved method for the devolatilization of synthetic resinous materials which are readily thermally degraded.

It would also be beneficial if there were an improved method for the devolatilization of thermally degradable synthetic resinous material which results in a strandular or particulate particle wherein the particle had been subjected to a minimal heat history.

It would be further desirable if there were available an improved method for the devolatilization of thermally degradable synthetic resinous compositions which required apparatus which is relatively simple and compact.

These benefits and other advantages in accordance with the method of the present invention are achieved in a method for the devolatilization of thermally degradable synthetic resinous materials, the steps of the method comprising confining a mass of resinous synthetic thermoplastic material having volatile materials therein within a perforate configuration; rotating the configuration at a speed sufficient to cause heat plastified synthetic resinous material to be passed outwardly from the configuration; heating the resinous material to a temperature sufficient to heat plastify; spreading heat plastified resinous material by means of centrifugal force into a film; passing a gas over an exposed surface of the film; deforming the film under the influence of centrifugal force into a desired configuration and subsequently cooling the resinous material below its thermoplastic temperature.

The method of the present invention is readily practiced employing a wide variety of synthetic thermoplastic resinous materials. The single characteristic of a thermoplastic material required for use in the method of the present invention is that it heat plastify and flow under centrifugal force.

The method of the present invention is applied with particular benefit to such readily thermally degradable materials as polymers of vinylidene chloride including vinylidene-vinyl chloride copolymers, vinylidene chloride-acrylonitrile copolymers, vinylidene chloride-ethyl acrylate copolymers and the like. The method of the present invention may also be used with benefit with such materials as heat plastifiable vinyl chloride polymers such as copolymers of 90 percent vinyl chloride and 10 percent ethyl acrylate, copolymers of vinyl chloride with vinylidene chloride, as well as alkenyl aromatic resins including polyolefins such as polyethylene, polypropylene and the resinous copolymers thereof.

In the practice of the method of the present invention, it is generally desirable to provide the resinous material in particulate form such as in the form of beads as obtained directly from a suspension polymerization or in the form of the dried coagulant obtained when a latex is coagulated. The particulate material may have either high or low bulk density and be in the form of powder, granules, compacted pellets or loose fluffy aggregates. The precise temperature of the polymer composition employed during the volatile period is ont readily determinable as in the method of the present invention. Centrifugal force is employed to forward the melted or heat plastified resinous composition.

Practice of one embodiment of the method of the invention will become apparent by reference to the figure wherein there is illustrated a devolatilization apparatus generally designated by the reference numeral 10. The devolatilization apparatus 10 comprises in cooperative combination a thermally conducting rotor 11. The rotor 11 has a generally circular configuration. The rotor 11 defines a centrally disposed feed aperture 12 through which particulate resinous material may be introduced into a confining configuration or cavity 14. The configuration or cavity 14 is defined by a generally cylindrical thermally conducting wall 15. The wall 15 has defined therein a plurality of apertures 16 providing communication between the confining configuration 14 and spaced external to the wall 15. The rotor 11 defines an internal annular corrugated passageway 18. The passageway 18 has annular corrugations which form a complete circle within the rotor. The passageway 18 has a first or feed end 19 and a second or discharge end 20. Adjacent the first end 19 of the passageway 18 is a feed plenum 21. A plurality of passageways 22 provide communication between the external surface of the rotor and a wall 23 of the passageway 18 which is directed away from the wall 15. The rotor 11 defines an annular discharge plenum 25 adjacent the second end 20 of the passageway 18 and in full communication therewith. The discharge plenum 25 is peripherally disposed within the rotor 11. The rotor 11 defines a plurality of generally radially extending discharge orifices 26 disposed about the periphery of the rotor and in communication with the discharge plenum 25. Strands 27 are shown emerging from the orifices 26. A plurality of gas discharge passages 28 are in communication with the discharge plenum 25. The passages 28 enter the plenum 25 in such a manner that a material passing through the passageway 18 under the influence of centrifugal force when the rotor is spun around its axis of generation does not enter the gas discharge passages. The rotor 11 is rotatably mounted upon a shaft 31 which is generally coaxial with the axis of generation of the rotor. The shaft 31 is operatively connected to a motor 32 adapted to rotate the shaft and rotor at a desired speed. The rotor 11 has in association therewith a first heating means 34 and a second heating means 35. Beneficially, the heating means 34 and 35 are annular electrical induction heaters for heating the rotor 11. A hollow guide 36 is disposed above the opening 12. The guide 36 has a first opening 37 and a second or lower opening 38. Particulate material 40 is discharged into the open end 30 of the guide 36 from a supply means 41.

Strand severing means 42 are disposed generally adjacent the periphery of the rotor 11 and sever the extruded strand 27 into a plurality of particles of desired size. The strand severing means beneficially are an air cooled blade. For example, a razor blade having a flow of air along the length of the blade generally parallel to the cutting edge or alternately spinning discs with sharpened edges to slice the extruded filament may be utilized. Thus, optionally, for those materials which form strands rather than droplets, either a strandular or a granular product is readily obtained.

In the practice of the method of the present invention, a rotor such as the rotor 11 is rotated, a particulate thermoplastic material is passed through the opening 12 into the confining configuration 14. Centrifugal force causes the particulate material to be held against the wall 15. Heat from the rotor 11 supplied by the induction coils 34 and 35 melts the resinous material adjacent the wall 15. Centrifugal force causes the material to be passed through the screen into the plenum 21 and strike the wall of the passage within the rotor. The molten material is spread as a thin film on the inwardly facing walls of the passageway 18 where it progresses outwardly to the discharge plenum 25. The spinning motion of the rotor causes gas such as air or nitrogen if desired to be drawn inwardly through the openings 22. The gas concurrently flows with the molten resinous composition toward the plenum 25. The gas is discharged through the passage 28 and the synthetic resinous material through the openings 26 in the form of a strand 27. The particular corrugated annular configuration shown in the figure causes the material to be alternately transferred from one side of the passageway 18 to the other side as it progresses from the first or inner end 19 to the outer end 20.

It is not essential to employ the specific apparatus shown in the figure. The heat plastified resinous material may be deposited on a disc comb or other rotating configuration wherein it will be centrifugally moved from an area generally adjacent the center of the rotating configuration in the form of thin film, streamers or droplets through a gas which entrains the volatile materials. Among the many rotor configurations which are suitable for practice in the method of the present invention are those shown in U.S. Patents 3,061,200 and 3,095,149.

By way of further illustration, an apparatus is constructed generally as depicted in the figure. The rotor of the apparatus has an overall diameter of 24 inches. The inner perforate wall has a diameter of 6 inches. The annular passageway corresponding to the passageway 18 has a width of approximately 0.125 inch and a total of 10 annular corrugations are defined between the center and the periphery of the rotor. The rotor is fabricated from steel and inductively heated with 60 cycle current by means of induction coils positioned generally as shown in the figure. The coils are adjustably mounted and movable along the axis of rotation along the rotor in order to increase or reduce inductive coupling along the rotor and the coil. A granular resinous composition comprising polystyrene, and monomeric styrene and ethylbenzene is devolatilized in the heated rotor while it is rotating at a speed of about 5 thousand r.p.m. The resinous composition contains 1.07 weight percent volatiles (presumably consisting of styrene and ethylbenzene) before treatment. After extrusion from the rotor and severing the extruded strands into granules the extruded granulated material contains 0.1 weight percent volatiles after a single pass through the apparatus. An uncured epoxy resin composition containing about 4 weight percent toluene, in a single pass through the apparatus, operating under the hereinbefore described conditions is reduced to about 0.17 weight percent volatiles, presumably toluene. Excellent devolatilization results are also obtained employing a copolymer of 10 weight percent ethyl acrylate, 90 weight percent vinyl chloride containing minor quantities of methyl ethyl ketone.

The method of the present invention is also beneficial in removing residual hydrocarbons such as hexane from polyethylene and polypropylene. Beneficially, a copolymer of 85 weight percent vinylidene chloride and 15 weight percent vinyl chloride containing 2 weight percent tetrahydrofuran is rapidly devolatilized to a tetrahydrofuran level of less than about 0.1 weight percent with no significant decrease in the heat stability of the resin. The rate of throughput is generally proportional to the amount of heat supplied to the rotor. As the induction coils are moved closer to the rotor, throughput is increased, and as the coupling between the rotor and the induction coils is reduced by moving the coils away from the rotor, the throughput is lessened. Beneficially, position of the induction coils employing a constant rotor speed serves to control the size of the strand obtained. It is noted that the heat stability of the resultant polymer is substantially improved when compared with the heat stability of like compositions devolatilized by conventional methods.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A method for devolatilization of synthetic resinous thermoplastic materials, the steps of the method comprising confining a mass of a synthetic resinous thermoplastic material volatile materials therein within a perforate configuration, rotating the configuration at a speed sufficient to cause heat plastified synthetic resinous material to be passed outwardly from the configuration, heating the resinous material to a temperature sufficient to heat plastify the material, spreading heat plastified resinous material by means of centrifugal force into a film, passing a gas over an exposed surface of the film, deforming the film under the influence of centrifugal force into a desired configuration, and subsequently cooling the resinous material below its thermoplastic temperature.

2. The method of claim 1 including the step of alternately transferring the film from a first annularly corrugated surface to a second annularly corrugated surface while in the heat plastified condition.

3. The method of claim 1 wherein heat is applied to the resinous material by means of the perforated configuration.

4. The method of claim 1 wherein the synthetic resinous material is readily thermally degradeable.

5. The method of claim 4 wherein the thermally degradeable material is a vinylidene chloride polymer.

6. The method of claim 1 wherein the film is formed into a plurality of strands.

7. The method of claim 1 wherein the gas concurrently flows with the resinous film.

8. The method of claim 1 wherein the perforate restraining means is inductively heated.

References Cited

UNITED STATES PATENTS

| | | | |
|---|---|---|---|
| 1,289,892 | 12/1918 | Perry | 264—176 |
| 1,293,535 | 2/1919 | Perry | 264—171 |
| 1,500,932 | 7/1924 | Hooper | 18—8 |
| 3,040,005 | 6/1962 | Bernhardt | 264—349 |
| 3,040,377 | 6/1962 | Slayter | 18—8 |

FOREIGN PATENTS 384,703 4/1963 Japan.

ROBERT F. WHITE, *Primary Examiner.*

S. I. LANDSMAN, *Assistant Examiner.*